United States Patent Office 2,995,553
Patented Aug. 8, 1961

2,995,553
SUBSTITUTED PIPERAZINES
Armiger H. Sommers, Lake Forest, Ill., assignor to Abbott Laboratories, North Chicago, Ill., a corporation of Illinois
No Drawing. Filed Jan. 25, 1960, Ser. No. 4,209
7 Claims. (Cl. 260—268)

This invention is concerned with novel substituted piperazines corresponding to the formula

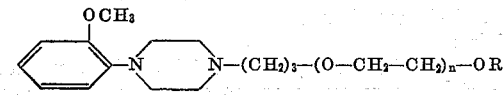

In this and succeeding formulas, $n$ represents a whole number from 1 to 3 inclusive, and R' represents hydrogen or methyl. The therapeutically acceptable, non-toxic, acid-addition salts of the bases included in the above formula are also contemplated to be encompassed within the scope of the present invention and are to be considered as equivalents thereof. Appropriate acid-addition salts are those derived from mineral acids such as hydrochloric acid, hydrobromic acid, hydriodic acid, phosphoric acid and sulfuric acid, as well as organic acids such as acetic, picric, citric, tartaric, benzoic, salicylic, glycolic, succinic, nicotinic, ascorbic, maleic, malic or lactic acids, and the like.

The bases as well as the acid-addition salts of said bases are valuable therapeutic agents and, more particularly, they are extremely useful as hypotensive agents in animals. The compounds also reduce excitement of the animal by relaxing the skeletal muscles to produce a tranquilizing action. When a 25 mg. dose of 1-(ortho-methoxyphenyl) - 4-[3-(2-hydroxyethoxy)-propyl]-piperazine is administered to a cat via the intravenous route, there is an immediate marked drop in blood pressure.

The new and novel compounds of this invention may be prepared as illustrated by the following reaction wherein X represents a halogen, preferably chlorine:

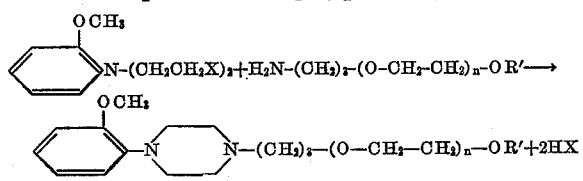

The reaction is carried out in the presence of an inert organic solvent such as pyridine, benzene, toluene or a lower alkanol (preferably ethanol) and takes place smoothly from room temperature to the reflux temperature of the reaction mixture with the formation of the desired product and hydrohalide of reaction. Good results are obtained when employing at least 3 molecular proportions of the primary amine per mole of N,N-bis-(beta-haloethyl)-ortho-methoxyaniline. Upon completion of the reaction, the desired product may be isolated by conventional methods.

The acid-addition salts of the above base products can be readily prepared by methods well known to those skilled in the chemical art. Thus, the base dissolved in a lower alkanol, preferably ethanol, is added to the appropriate acid dissolved in the same solvent in suitable molar amounts. The reaction mixture is then cooled and the salt which precipitates is removed by filtration and dried.

The following examples illustrate the invention but are not to be construed as limiting the scope thereof.

EXAMPLE I 1-(ortho-methoxyphenyl)-4-[3-(2-hydroxyethoxy)-propyl]-piperazine

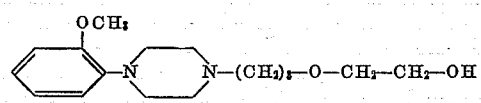

A solution of 25 grams (0.1 mole) of N,N-bis-(beta-chloroethyl)-otho-anisidine and 36 grams (0.3 mole) of 1-amino-3-(2-hydroxyethoxy)-propane in 200 ml. of ethanol is heated at the boiling temperature and under reflux for 5 hours. The solvent is then removed by distillation and the residue dissolved in 250 ml. of water. The aqueous mixture is extracted twice with 150 ml. portions of benzene and the combined benzene extracts are fractionally distilled to obtain the desired 1-(ortho-methoxyphenyl) - 4-[3-(2-hydroxyethoxy)-propyl]-piperazine as a viscous liquid boiling at 185°–190° C. at 0.2 mm. pressure and having a refractive index $n/D$ of 1.5470 at 25° C. Anal. calc'd. for $C_{16}H_{26}N_2O_3$: C=65.3%; H=8.9%; N=9.5%. Found: C=65.3%; H=9.0%; N=9.6%.

The dihydrochloride salt of the base prepared above is obtained by dissolving one equivalent of said base in isopropyl alcohol and treating the resulting solution with two equivalents of anhydrous hydrogen chloride. The dihydrochloride salt which precipitates upon cooling is separation by filtration and is found to melt at 178°–180° C. Anal. calc'd. for $C_{16}H_{28}Cl_2N_2O_3$: C=52.3%; H=7.7%; N=7.6%. Found: C=51.8%; H=7.5%; N=8.0%.

The free base can be readily converted to other salts such as the hydrobromide, hydroiodide, sulfate, phosphate, acetate, benzoate, salicylate, glycolate, succinate, nicotinate, ascorbate, tartrate, maleate, malate, lactate, and the like by neutralization with the appropriate acid.

EXAMPLE II 1-(ortho-methoxyphenyl)-4-[3-(2-hydroxyethoxy-ethoxy-propyl]-piperazine

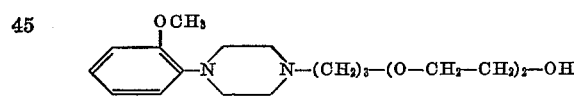

A solution of 25.0 grams (0.1 mole) of N,N-bis-(beta-chloroethyl)-ortho-anisidine and 43.0 grams (0.3 mole of 1-amino-3-(2-hydroxyethoxyethoxy)-propane in 75 ml. of ethanol is heated at the boiling temperature and under reflux for 14 hours to complete the reaction. Upon completion of the reaction, the reaction mixture is processed as described in Example I to obtain the desired 1-(ortho-methoxyphenyl) - 4 - [3 - (2-hydroxyethoxyethoxy)-propyl]-piperazine as a colorless liquid boiling at 196° C. at 0.1 mm. pressure and having a refractive index $n/D$ of 1.5375 at 25° C. Anal. calc'd. for $C_{18}H_{30}N_2O_4$: C=63.9%; H=8.9%; N=8.3%. Found: C=63.7%; H=8.8%; N=8.4%.

On neutralization of the free base thus prepared with the appropriate acid, the hydrochloride, hydrobromide, hydroiodide, sulfate, phosphate, acetate, benzoate, picrate, salicylate, glycolate, succinate, nicotinate, ascorbate, tartrate, maleate, lactate and the like are readily obtained. The dipicrate salt melts at 133°–134° C.

EXAMPLE III

*1-(ortho-methoxyphenyl)-4-[3-(2-methoxyethoxyethoxyethoxy)-propyl]-piperazine*

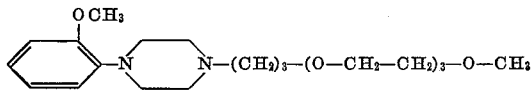

A solution of 13 grams (0.05 mole) of N,N-bis-(beta-chloroethyl)-ortho-anisidine and 31 grams (0.15 mole) of 1-amino-3-(2-methoxyethoxyethoxyethoxy)-propane in 75 ml. of ethanol is heated at the boiling temperature and under reflux for 14 hours. The reaction mixture is thereafter processed as described in Example I to obtain the desired 1-(ortho-methoxyphenyl)-4-[3-(2-methoxyethoxyethoxyethoxy)-propyl]-piperazine as a viscous liquid boiling at 200° C. at 0.1 mm. pressure and having a refractive index n/D of 1.5160 at 25° C. Anal. calc'd. for $C_{21}H_{36}N_2O_5$: C=63.6%; H=9.2%; N=7.1%. Found: C=63.5%; H=9.3%; N=7.0%.

The hydrochloride salt of the above base is prepared by reacting equimolecular proportions of said base and anhydrous hydrogen chloride in isopropyl alcohol. The salt melts at 132°–134° C.

In a manner similar to that described in Example I, the following compounds as well as their acid-addition salts can be prepared:

1-(ortho-methoxyphenyl)-4-[3-(2-methoxyethoxy)-propyl]-piperazine by the reaction of 1-amino-3-(2-methoxyethoxy)-propane and N,N-bis-(beta-bromoethyl)-ortho-methoxyaniline.

1-(ortho-methoxyphenyl)-4-[3-(2-methoxyethoxyethoxy)-propyl]-piperazine by the reaction of 1-amino-2-methoxyethoxyethoxypropane and N,N-bis-(beta-iodoethyl)-ortho-methoxyaniline.

1-(ortho-methoxyphenyl)-4-[3-(2-hydroxyethoxyethoxyethoxy)-propyl]-piperazine by the reaction of 1-amino-2-hydroxyethoxyethoxyethoxypropane and N,N-bis-(beta-bromoethyl)-orthomethoxyaniline.

Neutralization of any of the above free bases with the appropriate acid results in the formation of the corresponding hydrochloride, hydrobromide, hydroiodide, sulfate, phosphate, acetate, benzoate, salicylate, glycolate, succinate, nicotinate, ascorbate, tartrate, maleate or lactate.

The N,N-bis-(beta-haloethyl)-ortho-methoxyanilines employed as starting materials in the present invention may be prepared by heating one molecular proportion of orthomethoxyaniline with two molecular proportions of ethylene oxide at a temperature of from 75° to 150° C. in a confined space, preferably a stainless steel bomb. The resulting N,N-bis-(beta-hydroxyethyl)-ortho-methoxyaniline intermediate is thereafter separated by fractional distillation of the reaction mixture. Further treatment of this intermediate with phosphorus oxyhalide, preferably $POCl_3$, on a steam bath will produce the desired product which is isolated by adding water to the reaction mixture, extracting said mixture with benzene and fractionally distilling the benzene extract. N,N-bis-(beta-hydroxyethyl)-ortho-anisidine is a viscous oil boiling at 145°–147° C. at 0.3 mm. pressure whereas N,N-bis-(beta-chloroethyl)-ortho-anisidine is a viscous liquid boiling at 146°–150° C. at 0.1 mm. pressure.

This application is a continuation-in-part of my copending application, U.S. Serial No. 795,579, filed February 26, 1959 now abandoned.

I claim:

1. Substituted piperazines selected from the group consisting of (a) compounds corresponding to the formula

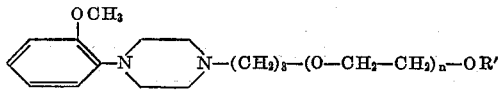

wherein n represents a whole number from 1 to 3, inclusive, and R' represents a member of the group consisting of hydrogen and methyl, and (b) pharmacologically acceptable, non-toxic, acid-addition salts thereof.

2. 1-(ortho-methoxyphenyl)-4-[3-(2-hydroxyethoxy)-propyl]-piperazine.

3. 1-(ortho-methoxyphenyl)-4-[3-(3-hydroxyethoxyethoxy)-propyl]-piperazine.

4. 1-(ortho-methoxyphenyl)-4-[3-(2-methoxyethoxyethoxyethoxy)-propyl]-piperazine.

5. The dihydrochloride salt of 1-(ortho-methoxyphenyl)-4-[3-(2-hydroxyethoxy)-propyl]-piperazine.

6. The dipicrate salt of 1-(ortho-methoxyphenyl)-4-[3-(2-hydroxyethoxyethoxy)-propyl]-piperazine.

7. The hydrochloride salt of 1-(ortho-methoxyphenyl)-4-[3-(2-methoxyethoxyethoxyethoxy)-propyl]-piperazine.

No references cited.